United States Patent [19]

Williams

[11] 3,803,336

[45] Apr. 9, 1974

[54] ACOUSTIC TORPEDO BEAM PATTERN SIMULATOR

[75] Inventor: Michael L. Williams, Gaithersburg, Md.

[73] Assignee: The United States of America as represented by the Secretary of the Navy, Washington, D.C.

[22] Filed: Sept. 7, 1972

[21] Appl. No.: 285,895

[52] U.S. Cl. ............................................. 35/10.4
[51] Int. Cl. .......................................... G09b 9/00
[58] Field of Search ..................................... 35/10.4

[56] References Cited
UNITED STATES PATENTS

| | | |
|---|---|---|
| 3,403,247 | 9/1968 | Morgan et al. ................. 35/10.4 X |
| 3,435,408 | 3/1969 | Moore ............................ 35/10.4 X |
| 3,484,738 | 12/1969 | Autrey ........................... 35/10.4 X |

*Primary Examiner*—T. H. Tubbesing
*Attorney, Agent, or Firm*—Richard S. Sciascia; J. W. Pease; H. A. David

[57] ABSTRACT

A simulation system wherein directional characteristics of a hydrophone array are simulated by a network of voltage variable time delay elements which are controlled to produce, at points between selected ones of the elements, phase shifted replicas of a sound analagous electrical signal. The replicas are fed to appropriate channels of a target seeking torpedo acoustic panel forming part of the simulation system.

8 Claims, 4 Drawing Figures

3,803,336

ACOUSTIC TORPEDO BEAM PATTERN SIMULATOR

BACKGROUND OF THE INVENTION

This invention relates generally to the art of sonar simulation, and more particularly to the generation of electrical signals which are simulative of those produced by a direction sensing hydrophone array when stimulated by sounds received through the water from a predetermined direction.

Hydrophone arrays have been produced in various shapes and arrangements and the manner in which the direction sensing is accomplished is well understood by those skilled in the art to which this invention pertains. Suffice it to say here that when a pair of hydrophones which are spaced apart by a distance $d$ are approached by a monopulse sound wavefront travelling along a line of sound at an angle $\beta$ which is different than 90° to a line joining the hydrophones, the wavefront will reach one of the hydrophones sooner than the other by a time $T$ represented by the equation: $T = d \cos \beta/c$ seconds where $d$ is in feet and $c$ is the speed of sound in feet per second. The outputs of the hydrophones will therefore be characterized by a phase difference $\Phi$ which may be represented by the equation: $\Phi = -\omega T$ radians, where $\omega = 2\pi f$, and $f=$ the frequency of the sound.

Arrays of four or more hydrophones may be conveniently used to determine the direction of arrival of monopulse sound both in azimuth and in elevation. Such is the case, for example, with acoustic homing torpedoes. In such cases the direction from which the sound approaches may be conveniently expressed in terms of functions of $\cos \beta$ and of $\cos \gamma$ where $\beta$ is the horizontal angle between the hydrophone plane and the line of sight to the target and $\gamma$ is the vertical angle between the hydrophone plane and the line of sight.

For various purposes, among which are the testing of homing torpedo systems, the training of personnel, and the determining of effectiveness of countermeasure means, it is desirable to be able to generate signals which accurately simulate the outputs of hydrophone arrays when receiving signals arriving from various directions. With the growing availability of reliable digital computers the simulation arts are more and more utilizing digital techniques. However wholly digital simulation in a system of the just mentioned type would make inordinate demands on the storage capability of a digital computer.

SUMMARY OF THE INVENTION

With the foregoing in mind it is a principal object of this invention to provide an improved apparatus for simulating the beam patterns associated for example with acoustic homing torpedoes.

Another object of this invention is the provision of means for imparting plane wave characteristics to simulated sonar signals so as to cause these signals to appear to emanate from particular directions in water space.

Another object is the provision of apparatus of the foregoing character which utilizes time delay techniques, rather than single frequency phase shifting methods, in order to provide the capability of accurately processing broadband sound signals.

As another object the invention aims to provide, in addition to the acoustic processing required for beam pattern simulation, means for performing all of the necessary relative arrival angle computations using hybrid analog-digital apparatus, whereby the digital computer which is used for overall control of the simulation system is relieved of the severe workload which would be imposed thereon if these computations were performed digitally.

The invention may be further said to reside in certain novel constructions, combinations, and arrangements of parts by which the foregoing objects and advantages are achieved, as well as others which will become apparent from the following detailed description of a preferred embodiment.

DESCRIPTION OF THE PREFERRED EMBODIMENT

Figure 1:
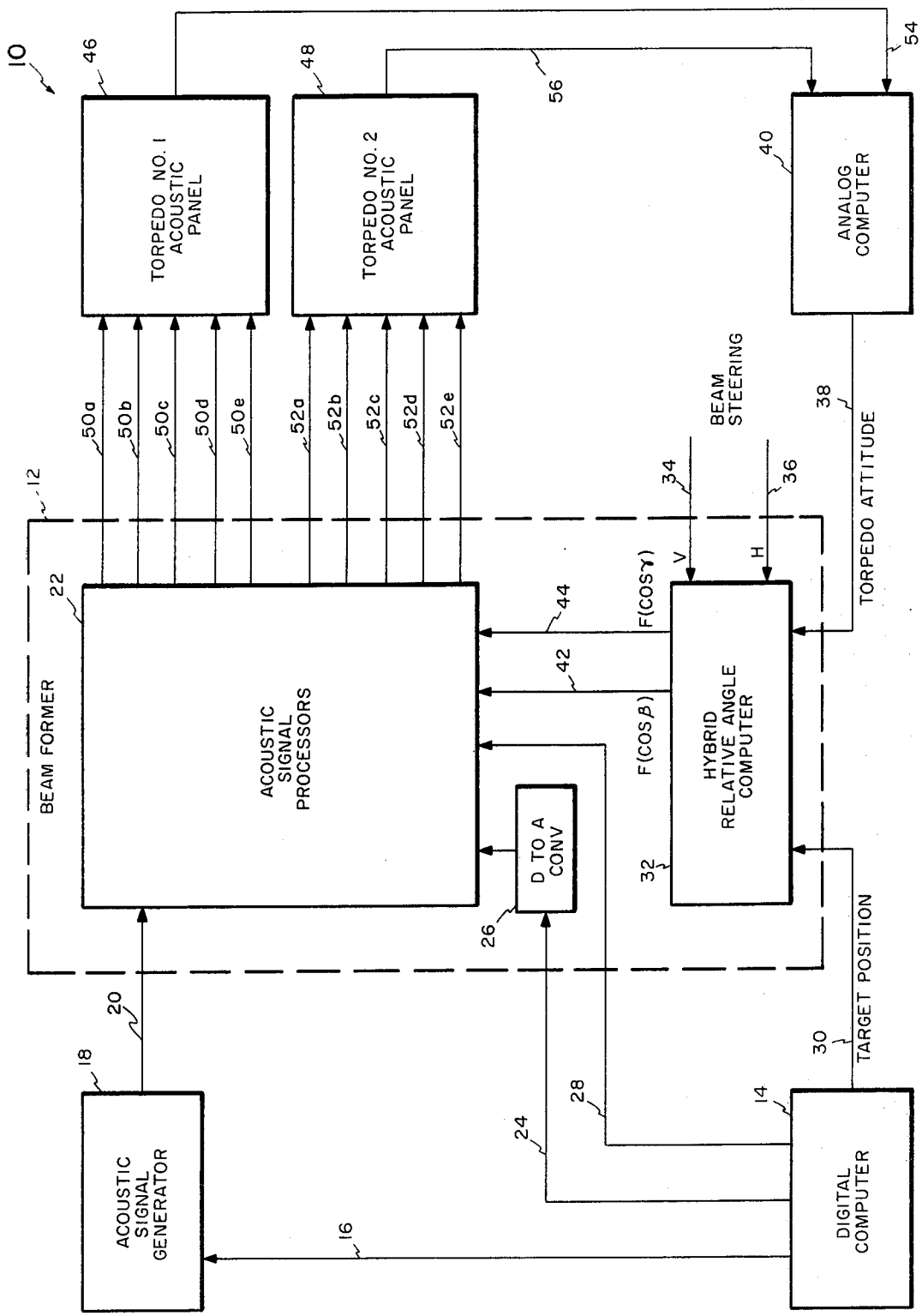
FIG. 1 is a diagrammatic illustration in block form of a simulation system including beamformer means embodying the invention.

An acoustic torpedo simulation system 10 having a beamforming portion 12 embodying the present invention is illustrated in FIG. 1 as an example of the environment in which the invention is advantageously used. In that system a digital computer 14, which has basic control over the system, provides frequency, path attenuation, and signal strength control signals or data represented by flow line 16 to an acoustic signal generator 18. The acoustic signal generator 18 is capable of providing a plurality of electrical signals, each representing a source of sound at a predetermined point in water space. These signals, which in one actual embodiment are 28 in number, are represented collectively by flow line 20 and are applied to 28 acoustic signal processors represented collectively by the block 22 in the beamforming portion 12.

The digital computer 14 provides beam pattern attenuation data via line 24 and via digital to analog means 26 to the acoustic signal processors, and phase inversion data via line 28. The computer 14 further provides target position data for the 28 sound sources as shown by line 30 to a hybrid relative angle computer 32.

The relative angle computer 32 also receives horizontal and vertical beam steering, sweep, or angle scintillation data represented by lines 34, 36, and torpedo attitude data 38 from an analog computer 40 for each of two torpedoes the operation of which can be simulated by the system 10. The outputs of the relative angle computer 32 are signals which are a function of $\cos \beta$ and a function of $\cos \gamma$, represented by lines 42, 44, applied to the acoustic signal processors 22.

The processors 22, one for each of the twenty-eight acoustic signal inputs, respond to the $\cos \beta$ and $\cos \gamma$ inputs 42, 44 to direct the appropriate outputs to each of two torpedo acoustic panels 46 and 48. The outputs of the 28 processors 22, one of which will later be described in detail with reference to FIG. 4, comprise five signals from each processor, and the output from fourteen of the processors are applied to the acoustic panel 46 while those from the remaining processors are applied to the panel 48. The outputs of the first fourteen processors are represented collectively by lines 50a – 50e, while those of the remaining processors are represented by lines 52a – 52e. The torpedo acoustic panels 46 and 48 have their outputs applied as shown by lines 54, 56 to the analog computer 40 to complete the simulation loop.

Figure 2:
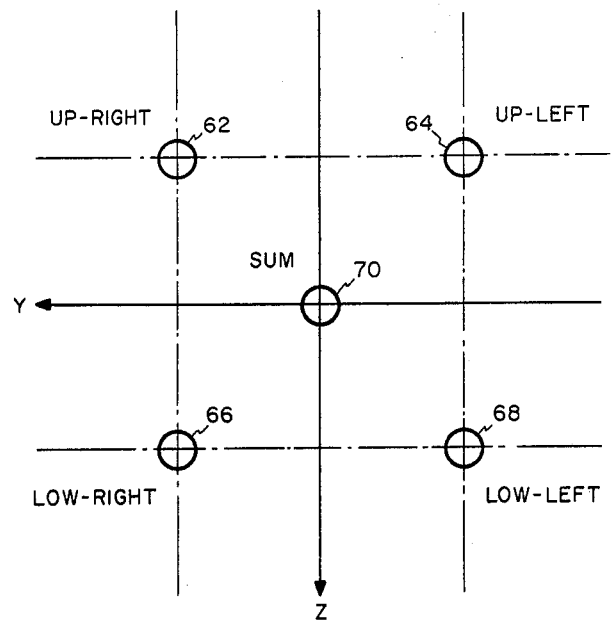
FIGS. 2 and 3 are diagrammatic illustrations of alternative configurations of hydrophone channels.
Figure 3:
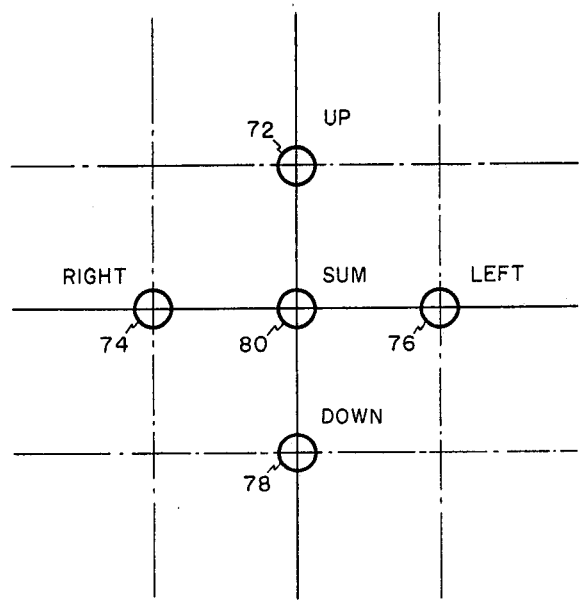

Referring now to FIGS. 2 and 3, there are shown two types of directional hydrophone channel configurations. That illustrated in FIG. 2 comprises five channels, four of which 62, 64, 66 and 68 represent directional quadrants. Thus, the directions up-right, up-left, low-right, and low-left are represented by channels 62, 64, 66, and 68 respectively, while the fifth channel 70 represents the sum of sound components on the central look axis of the torpedo.

In the configuration illustrated in FIG. 3, directional quadrants of up, right, left, and down are represented by channels 72, 74, 76, and 78 respectively, while the channel 80 represents the sum of sound components arriving along the central look axis of the torpedo. In each of the FIGS. 2 and 3 it will be recognized that the directional terminology is with respect to the torpedo and as viewed from the direction from which the sound travels.

The channel configurations just described are served by the outputs of the acoustic signal processor 22 of the beam-forming means as represented by the flow lines 50a – 50e in FIG. 1. The configurations of FIGS. 2 and 3 are alternatives so that in the system of FIG. 1 the torpedo panels 46 and 48 may use either configuration.

Figure 4:
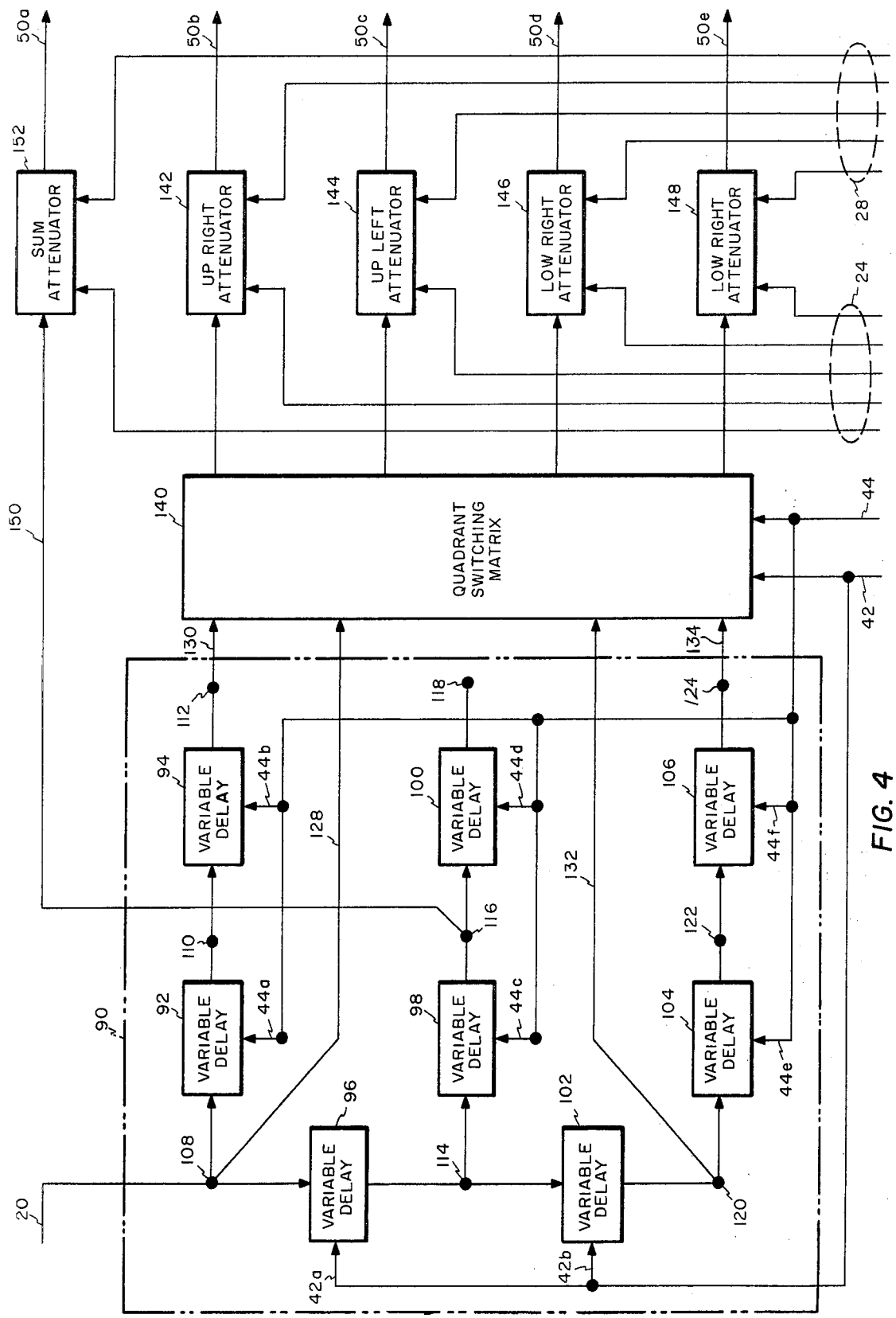
FIG. 4 is a diagrammatic illustration in block form of an acoustic signal processor means forming part of the system of FIG. 1.

Now the 28 acoustic signal processors 22 each comprise a beamforming circuit an exemplary one of which is illustrated in FIG. 4. The circuit of FIG. 4, which is used with the hydrophone channel configuration of FIG. 2, comprises a network 90 of eight phase shifting, voltage variable time delay elements 92, 94, 96, 98, 100, 102, and 106. These time delay elements are connected as shown between nine junction points 108, 110, 112, 114, 116, 118, 120, 122, and 124. Five of these junctions namely 108, 112, 120, 124, and 116 are selected to correspond to the hydrophone channels 62, 64, 66, 68, and 70 of FIG. 2. The acoustic input signal, line 20, is applied as shown to the junction 108. The quadrant representing junctions 108, 112, 120, and 124 are connected as shown by lines 128, 130, 132, and 134 to a quadrant switching matrix 140. The matrix 140 serves to selectively connect the junctions to attenuators 142, 144, 146, and 148 while the axial sum representing junction 116 is connected directly by line 150 to an attenuator 152.

The phase shifting time delay elements 96 and 102 provide vertical phase control and so are controlled as a function of Cos $\gamma$ as shown by lines 42, 42a, 42b, whereas the phase shifting time delay elements 92, 94, 98, 100, 104, and 106 are for providing horizontal phase control and so are controlled as a function of Cos $\beta$ as shown by lines 44, 442a – 44f.

The phase shifting time delay elements can be any of several well known constructions in which the time delay effected can be voltage controlled, for example, a typical L-C delay line circuit utilizing voltage variable capacitance. These have the advantage of providing a delay which is proportional to the frequency of the input signal, thereby making the system described suitable for broadband simulation. This is important to simulation of various sonars which are not of a narrow single frequency.

The novel network 90 permits smooth directional changes of the simulated sound source with respect to the torpedo, and avoids the discontinuities and transients found in prior art simulators wherein fixed delay lines are switched in and out to effect changes in simulated direction.

In operation, the phase shifter array 90 accepts the acoustic input signal via line 20 and generates a nine-point array in which the signal at each of the points is delayed appropriately in respect to the others. The points 108, 110, 112, 114, 116, 118, 120, 122, and 124 may be considered to be points on a plane surface arranged in a 3×3 array in which the spacing between columns is equal to $S_y$ and the spacing between rows is equal to $S_z$. The values of $S_y$ and $S_z$ are programmed in the computer 14 and are selected to provide the proper slope of phase vs. geometrical arrival angle to suit the transducer being simulated.

The acoustic wavefront is assumed to arrive at point 108 at a time which is earlier than or equal to the time of arrival at any other point on the nine point array. The signals are tapped off at appropriate points which correspond to the hydrophone channel configuration of the torpedo. The type of hydrophone channel configuration shown in FIG. 2 is formed by selecting points 108, 112, 116, 120, and 124, whereas selecting points 110, 114, 116, 118, and 122 would correspond to the hydrophone channel configuration of FIG. 3. The phase shifters are controlled by the signals supplied by the analog output of the relative angle computer 32. These signals are produced in the form of absolute value and sign, and as mentioned earlier, the time delay between columns of the nine point array is controlled by a function of Cos $\beta$, while the delay between rows is controlled by a function of Cos $\gamma$.

Analog computer 40 receives horizontal and vertical data derived from alternatively (dependent upon type of hydrophone channel — FIG. 2 or FIG. 3) acoustic panel No. 1 or acoustic panel No. 2, and provides a computation to produce as an output an electrical vector representing the pseudo torpedo attitude. This is a simple analog computer which resolves rectangular data into polar coordinates. The vector output is a magnitude plus a sign, and is applied via line 38 as an input to computer 32.

Hybrid relative angle computer 32 is a computer using digital and analog input data and producing an analog output. It is used, as previously mentioned herein, because wholly digital simulation in this system would make inordinate demands on the storage capability of a digital computer. Digital data on target position is provided as an input from digital computer 14 via line 30. Analog input re torpedo attitude is provided from analog computer 40 via line 38 to computer 32 as described above. This represents the directional error of the torpedo from its desired direct approach to the target. The torpedo attitude signal and the beam steering signals are computed in computer 32 to provide magnitude and polarity error signal corrections on output lines 42 and 44 to make corrections respectively for horizontal and vertical deviations.

The quadrant switching matrix 140 is used to appropriately connect the outputs of the phase shifter array 90 so as to provide the proper quadrant sense to the signals supplied to the torpedo acoustic panel. This switching is necessary since the phase shifter array 90 is a one quadrant device, i.e., the acoustic wavefront was assumed to arrive at point 108 prior to arriving at the other points. The quadrant switching matrix 140 uses the sign signals from the relative angle computer which indicate the quadrant in which the line-of-sound exists to perform the required switching. If the signs of Cos $\beta$ and Cos $\gamma$ are both positive, the line-of-sound would lie in the starboard and down directions.

Other configurations are possible which do not require the use of a quadrant switching matrix. The configuration which is shown, however, has the advantage of minimizing the amount of hardware required, thus reducing the cost and complexity. This simplification is important when a large number of paths are to be simulated. This configuration also has the advantage of providing good boresight stability. Since the time delays are all set to zero for a target lying along the X-axis, maximum directional stability is achieved at the point where it is most important.

The outputs of the quadrant switching matrix 140 and point 116 on the phase shifter array 90, which represents the sum signal, are processed further by the voltage controlled attenuators 152, 142, 144, 146, 148 in order to apply the appropriate amplitude patterns of the individual hydrophone channels. The control voltages for the attenuators are produced by D-to-A converters shown collectively at 26 in FIG. 1. These D-to-A converters are controlled directly by the digital computer 14 in the system 10. The system is designed so as to permit easy conversion from this method to one in which the amplitude functions would be obtained from function generators driven from the outputs of the relative angle computers. The use of analog methods of phase shifting and attenuation has the advantage of permitting filtering of the control signals so as to eliminate noise which would be caused by digital processing equipment. The acoustic processing portion is contained in a shielded enclosure. The control lines are filtered prior to entry into the enclosure.

Phase inversion controls are included in the attenuators. These controls may be used to simulate the 180 degree phase reversals which occur in the minor lobes of the sub-arrays of the transducer and receive their commands via lines 28.

Obviously many modifications and variations of the present invention are possible in the light of the above teachings. It is therefore to be understood that within the scope of the appended claims the invention may be practiced otherwise than as specifically described.

What is claimed is:

1. A simulation system including a source of electrical analog signals representative of water transmitted sounds, means for generating beam steering voltages corresponding to directions from which sounds to be detected, beamforming means, connected to receive said analog signals and responsive to said steering voltages to provide a plurality of phase altered replicas of said analog signals, and torpedo acoustic panel means for receiving said phase altered replicas and generating useful data therefrom, said system being characterized by the improvement wherein said beamforming means comprises:

a network including a plurality of voltage variable time delay elements;

said time delay elements being connected in the electrical equivalent of rows and columns; and switching means for connecting the outputs of selected ones of said delay elements to said acoustic panel means.

2. A simulation system as defined in claim 1, and further comprising:

attenuator means, connected between said delay elements and said acoustic panel means, for attenuating said replicas in accordance with beam characteristics being simulated.

3. A simulation system as defined in claim 1, and wherein:

said network comprises eight of said delay elements, the first and second of which are connected in series between a first junction point and a third junction point, with a second junction point between said first and second elements;

the third element being connected between said first junction point and a fourth junction point;

the fourth and fifth elements being connected in series between said fourth junction point and a sixth junction point, with a fifth junction point between said fourth and fifth elements;

the sixth element being connected between said fourth junction point and a seventh junction point; and the seventh and eighth elements being connected in series between said seventh junction point and a ninth junction point, with an eight junction point between said seventh and eighth elements.

4. A simulation system as defined in claim 3, and:

said analog signals being applied to said first junction point; and means for connecting said first, third, fifth, seventh, and ninth junction points to said acoustic panel means.

5. A simulation system as defined in claim 3, and:

said analog signals being applied to said first junction point; and means for connecting said second, fourth, fifth, sixth, and eighth junction points to said acoustic panel means.

6. A simulation system as defined in claim 2, and wherein:

said network comprises eight of said delay elements, the first and second of which are connected in series between a first junction point and a third junction point, with a second junction point between said first and second elements;

the third element being connected between said first junction point and a fourth junction point;

the fourth and fifth elements being connected in series between said fourth junction point and a sixth junction point, with a fifth junction point between said fourth and fifth elements;

the sixth element being connected between said fourth junction point and a seventh junction point; and the seventh and eighth elements being connected in series between said seventh junction point and a ninth junction point, with an eighth junction point between said seventh and eighth elements.

7. A simulation system as defined in claim 6, and said analog signals being applied to said first junction point; and means for connecting said first, third, fifth, seventh, and ninth junction points to said acoustic panel means.

8. A simulation system as defined in claim 6, and said analog signals being applied to said first junction point; and means for connecting said second, fourth, fifth, sixth, and eighth junction points to said acoustic panel means.

* * * * *